US011021359B2

(12) United States Patent
Bissen et al.

(10) Patent No.: US 11,021,359 B2
(45) Date of Patent: Jun. 1, 2021

(54) INTELLIGENT BEVERAGE DISPENSER

(71) Applicant: RIPRUP Company S.A., St. Peter Port (GG)

(72) Inventors: Monique Bissen, Pforzheim (DE); Josef Schucker, Ronco Sopra Ascona (CH)

(73) Assignee: RIPRUP Company S.A., St. Peter Port (GG)

( * ) Notice: Subject to any disclaimer, the term of this patent is extended or adjusted under 35 U.S.C. 154(b) by 0 days.

(21) Appl. No.: 16/825,189

(22) Filed: Mar. 20, 2020

(65) Prior Publication Data
US 2020/0299122 A1    Sep. 24, 2020

(51) Int. Cl.
*B67D 1/08* (2006.01)
*B67D 1/00* (2006.01)

(52) U.S. Cl.
CPC ......... *B67D 1/0888* (2013.01); *B67D 1/0014* (2013.01); *B67D 1/0857* (2013.01)

(58) Field of Classification Search
CPC .. B67D 1/0888; B67D 1/0014; B67D 1/0857; B67D 1/0884; B67D 2210/00099;
(Continued)

(56) References Cited

U.S. PATENT DOCUMENTS

| 2009/0069932 A1* | 3/2009 | Rudick | B67D 1/0888 700/239 |
| 2011/0049180 A1* | 3/2011 | Carpenter | B67D 1/0051 222/1 |

(Continued)

FOREIGN PATENT DOCUMENTS

| DE | 20 2010 006 679 U1 | 9/2010 |
| WO | 94/06547 A1 | 3/1994 |

(Continued)

OTHER PUBLICATIONS

EPO: "European Search Report"; Serial No. EP 19 16 4408; dated Aug. 29, 2019 (Search report in related European case).

*Primary Examiner* — Donnell A Long
(74) *Attorney, Agent, or Firm* — Bryan W. Bockhop; Bockhop Intellectual Property Law, LLC

(57) ABSTRACT

A method of controlling operation of a beverage dispenser, includes the following steps: selecting a water recipe from a plurality of water recipes, wherein each water recipe defines a set concentration of minerals to be solved in the water and wherein the water is mineralized based on the water recipe by adding minerals by a mineralization device; verifying, whether the user is allowed to adjust a user adjustable a property of the water to be mineralized by the mineralization device according to water recipe, wherein the user adjustable property comprises at least one of a set temperature of the water to be mineralized and a set carbonization of the water to be mineralized; preparing the water by at least one water preparation element according to the user adjustable property; and outputting the mineralized water to a user vessel; and further includes at least one of the following steps: activating on a display a temperature user interface element for adapting the temperature of the water to be mineralized in a predetermined temperature range, if the user is allowed to adapt the set temperature within the predetermined temperature range; and activating on the display a carbonization user interface element for adapting the set carbonization of the water to be mineralized in a predetermined $CO_2$ concentration range, if the user is allowed to adapt the set carbonization within the predetermined $CO_2$ concentration range.

15 Claims, 6 Drawing Sheets

(58) Field of Classification Search
CPC .......... B67D 2210/0001; B67D 1/0034; B67D 1/0027; B67D 1/0057; B67D 1/0406; B67D 1/0004; B67D 1/0009; B67D 1/0021; B67D 1/0015; B67D 1/004; C02F 2209/02; C02F 2307/10; C02F 1/008; C02F 1/68
See application file for complete search history.

(56) References Cited

U.S. PATENT DOCUMENTS

| | | | | |
|---|---|---|---|---|
| 2011/0159150 | A1* | 6/2011 | Uen | C02F 9/00 426/66 |
| 2012/0035761 | A1* | 2/2012 | Tilton | G06Q 30/0641 700/233 |
| 2012/0325845 | A1* | 12/2012 | Newman | B67D 1/127 222/1 |
| 2013/0233884 | A1* | 9/2013 | Furberg | B67D 1/1202 222/63 |
| 2013/0282451 | A1* | 10/2013 | Moore | G06Q 30/02 705/14.4 |
| 2014/0263411 | A1* | 9/2014 | Quartarone | B67D 1/0021 222/1 |
| 2015/0041408 | A1* | 2/2015 | Benavides | E21B 43/40 210/741 |
| 2015/0344284 | A1* | 12/2015 | Perkins | B67D 1/0037 222/1 |
| 2016/0095464 | A1* | 4/2016 | Jones | A47J 31/4403 62/177 |
| 2016/0129369 | A1* | 5/2016 | Dorfman | E03B 3/28 62/189 |
| 2016/0159632 | A1* | 6/2016 | Wheatley | B65D 47/0857 222/1 |
| 2017/0088410 | A1 | 3/2017 | Wing et al. | |
| 2018/0022593 | A1* | 1/2018 | Feola | A47J 31/41 700/232 |
| 2018/0132507 | A1* | 5/2018 | Siegel | A23L 2/54 |
| 2020/0031651 | A1* | 1/2020 | Schneidewend | A47J 31/407 |
| 2020/0079637 | A1* | 3/2020 | Kaplita | B67D 1/0058 |
| 2020/0087132 | A1* | 3/2020 | Moore | B67D 1/0016 |
| 2020/0109042 | A1* | 4/2020 | Jacobsen | A47J 31/521 |
| 2020/0122994 | A1* | 4/2020 | Cimatti | G06Q 20/3821 |
| 2020/0223682 | A1* | 7/2020 | Lane | B67D 1/0036 |

FOREIGN PATENT DOCUMENTS

| | | |
|---|---|---|
| WO | 2009/032877 A2 | 3/2009 |
| WO | 2010/019891 A2 | 2/2010 |
| WO | 2015/022692 A2 | 2/2015 |

* cited by examiner

| Water consumption purpose: | Remineralizing |
|---|---|
| mineral $X_N Y_M$ | $x_1$ µl/l |
| mineral $X_{N+1} Y_{M+1}$ | $x_2$ µl/l |
| mineral $X_{N+2} Y_{M+2}$ | $x_3$ µl/l |
| mineral $X_{N+3} Y_{M+3}$ | $x_4$ µl/l |
| mineral $X_{N+4} Y_{M+4}$ | $x_5$ µl/l |
| mineral $X_{N+5} Y_{M+5}$ | $x_6$ µl/l |
| temperature range: | T1 - T2 |
| Carbonization range: | C1 - C2 |

$X_N$ : cation
$Y_M$ : anion

Fig. 8

| Water consumption purpose: | Refreshment |
|---|---|
| mineral $X_N Y_M$ | $x_7$ µl/l |
| mineral $X_{N+1} Y_{M+1}$ | $x_8$ µl/l |
| mineral $X_{N+2} Y_{M+2}$ | $x_9$ µl/l |
| mineral $X_{N+3} Y_{M+3}$ | $x_{10}$ µl/l |
| mineral $X_{N+4} Y_{M+4}$ | $x_{11}$ µl/l |
| mineral $X_{N+5} Y_{M+5}$ | $x_{12}$ µl/l |
| temperature range: | T1 - T2 |
| Carbonization range: | C1 - C2 |

$X_N$ : cation $Y_M$ : anion

INTELLIGENT BEVERAGE DISPENSER

CROSS-REFERENCE TO RELATED APPLICATION(S)

This application claims the benefit of EP Patent Application No. EP19164408.7, filed Mar. 21, 2019, the entirety of which is hereby incorporated herein by reference.

BACKGROUND OF THE INVENTION

1. Field of the Invention

The present invention relates to an intelligent beverage dispenser allowing a user to select a beverage and to adapt particular parameters of the beverage.

Water dispensers of the prior art can filter water, temper water and carbonize water. Some water dispersers can filter and mineralize water.

2. Description of the Related Art

DE 20 2010 006 679 U1 discloses an apparatus for generating mineral water having a filter and at least one mineral container between the filter and the outlet. The apparatus further comprises a controller for controlling the feed of minerals from the at least one mineral container. If the water consumption by the user exceeds a daily limit of the daily water consumption, feeding of minerals is stopped or another specific formulated water is dispensed.

WO 94/06547 A1 discloses a water purification and dispensing apparatus comprising a water inlet for obtaining water from a supply source, a water purification system for removing impurities from the source water and a mineral addition system for add in desired minerals into the purified water U.S. Pat. No. 5,443,739 discloses a water purification and dispensing apparatus comprising a water inlet for obtaining water from a supply source, a water purification system for removing impurities of the source water and a mineral addition system for adding desired minerals to the purified water.

SUMMARY OF THE INVENTION

It is an object of the present invention to provide a method and beverage dispenser allowing a user to adapt physical parameters of the beverage generated by the water dispenser without requiring in-depth knowledge of the mineralization of the generated beverage.

The object of the present invention is achieved by a method according to claim 1 and a beverage dispenser according to claim 13.

The invention discloses a method of controlling operation of a beverage dispenser comprising a step of selecting a water recipe from a plurality of water recipes, wherein each water recipe defines a set concentration of minerals to be solved in the water and wherein the water is mineralized based on the water recipe by adding minerals/ions by a mineralization device. The method verifies, whether the user is allowed to adjust the user adjustable property of the water to be mineralized by the mineralization device according to the water recipe, wherein the user adjustable property comprises at least one of a set temperature of the water to be mineralized and a set carbonization of the water to be mineralized. The method prepares the water by the at least one water preparation element according to the user adjustable property. The method outputs the mineralized water prepared according to the user adjustable property to a user vessel.

The method further comprises the step of activating on a display a temperature user interface element for adapting the set temperature of the water to be mineralized in a predetermined temperature range, if the user is allowed to adapt the set temperature within the predetermined temperature range. Alternatively or additionally, the method comprises the step of activating on the display a carbonization user interface element for adapting the set carbonization of the water to be mineralized in a predetermined $CO_2$ concentration range, if the user is allowed to adapt the set carbonization within the predetermined $CO_2$ concentration range. The set mineral concentration may include concentration of one or a plurality of ions, minerals and/or trace elements. The water recipe may be selected automatically or may be selected by a user.

The water may be filtered, demineralized or the like before it is prepared by the at least one water preparation element and the mineralization device.

The water preparation device may comprise a tempering device. The method may comprise the step of tempering the water by the tempering device such that the actual temperature of the water is within a predetermined range about the set temperature before outputting the water to the user vessel.

The water preparation device comprises a carbonization device. The method further comprises the step of carbonating the water by the carbonization device such that the actual carbonization of the water is within a predetermined range about the set carbonization before outputting the water to the user vessel. Water can be carbonated by adding carbon dioxide ($CO_2$).

In one embodiment the mineralization of the water recipe is determined by the purpose of the water recipe, i.e. water consumption purpose. The purpose of the water recipe and/or the water consumption purpose may comprise refreshment of a human, remineralization of a human, accompanying a meal, preparing a meal, preparing tea, preparing coffee, pregnancy, nursing, breast-feeding, accompanying white wine, accompanying red wine, accompanying spirits, blending spirits or the like.

Based on the drinking purpose the water recipe may comprise a unique concentration of minerals. The mineral concentration can determine the maximum set temperature of the water. The maximum set temperature of the water determines the temperature range within which a user may adapt the temperature. If the temperature is too high, minerals may fall out (precipitate) in the water dispenser and the user may not receive the desired beverage. Further, elements of the water dispenser may be damaged. If the set temperature is too low, cooling of the water might take too long.

On the other hand, a water recipe for breakfast water, water for accompanying red wine, water for preparing a meal, water for cooking coffee and/or water for cooking tea must not be carbonized. This case, the user interface element for adapting the carbonization is not activated or displayed.

If a high set temperature has been selected, a high concentration of $CO_2$ cannot be achieved, since water can only solve a reduced amount of $CO_2$ at high temperature. On the other hand, if a high concentration of $CO_2$ has been selected, only a smaller set temperature range is allowed.

In other words, the method may determine the predetermined $CO_2$ concentration range as a function of the mineralization stipulated by the water recipe and/or by the set temperature. The method may determine the predetermined temperature range based on the mineralization as stipulated by the water recipe and/or by the set carbonization. These steps ensure that the user is supplied with a reproducible beverage, in other words the user is supplied with an individualized beverage having the taste expected by the user. Further, fall out (precipitating) of minerals in the water dispenser and thus damage of the water dispenser can be prevented.

The step of verifying, whether the user is allowed to adjust a property of the water mineralized based on the water recipe may comprise the step of verifying, whether the set mineral concentration of the water to be mineralized by the water recipe allows the user to adjust the set temperature and/or determining the predetermined temperature range in which the user can adapt the set temperature depending on at least one of the amount and types of minerals to be added by the mineralization device. The step of verifying can ensure that no fall out (precipitating) is caused by minerals introduced by the mineralization. Thereby, damage of the water dispenser can be avoided. Further, the user is provided with a beverage having a reproducible mineral concentration. The step of determining the predetermined temperature range may consider that no fall out of minerals introduced by the mineralization is caused. Also thereby, damaging of the beverage dispenser may be avoided and the user is provided with a reproducibly mineralized and/or mineralized beverage.

The method also comprises the step of activating the temperature user interface element for modifying the set temperature within the predetermined temperature range, if the set mineral concentration of the water to be mineralized by the water recipe allows the user to adjust the set temperature. The user is now enabled to adjust the set temperature according to his preferences within the predetermined set temperature range. Thereby, damage of the water dispenser may be avoided and it is ensured that the user is provided with beverage having a reproducible mineral concentration and thus a reproducible taste.

The step of verifying, whether the user is allowed to adjust a property of the water mineralized based on the water recipe may comprise the step of verifying, whether the set mineral concentration of the water to be mineralized by the water recipe allows to adjust the set carbonization and/or determining the predetermined $CO_2$ concentration range within which the user can adapt the set carbonization depending on the mineralization. If the set mineral concentration has been selected for the drinking purpose of breakfast water, accompanying of red wine, cooking tea, cooking coffee and/or preparing a meal no $CO_2$ must be added to the water. In such cases, the carbonization user interface is not activated or not displayed.

The method comprises also the step of activating the carbonization user interface element for modifying the set carbonization in the predetermined $CO_2$ concentration range, if the set mineral concentration of the water to be mineralized by the water recipe allows to adjust the set carbonization. The step of verifying, whether the user is allowed to adjust a property of the water to be mineralized based on the water recipe may comprise the step of verifying, whether the set carbonization selected by the user allows to adjust the temperature, and the step of determining the predetermined temperature range, within which the user can adapt the set temperature depending on the set carbonization. Water having a higher temperature can merely solve $CO_2$ in a lower carbonization. If the actual temperature of the water is raised above a threshold temperature, $CO_2$ may escape from the water, what is undesired for a user and for the lifespan of the beverage dispenser.

The step of verifying, whether the user is allowed to adjust a property of the water to be mineralized based on the water recipe may comprise the step of verifying, whether the set temperature selected by the user allows to adjust the carbonization of the water to be mineralized and determining the predetermined $CO_2$ concentration range within which the user can adapt the set carbonization depending on the set temperature. The higher temperature of the water, the lower the $CO_2$ concentration that can be solved in the water. These steps ensure that the user is provided with a reproducible beverage and ensure that damage of the beverage dispenser is avoided.

The step of verifying, whether the user is allowed to adjust a property of the water mineralized based on the water recipe may comprise the step of determining, whether ions of the mineralization device can precipitate and fall out, respectively, if the set temperature is higher than a predetermined temperature. The ions precipitating from the water may damage the water dispenser and elements thereof and may cause that the user is provided with beverage having an inappropriate mineralization. Alternatively or additionally the step of verifying, whether the user is allowed to adjust a property of the water mineralized based on the water recipe may comprise the step of determining, whether $CO_2$ added by the carbonization device can escape the water, if the set temperature is higher than a predetermined temperature. Escaping $CO_2$ may damage the beverage dispenser and elements thereof and may cause that the user is provided with beverage having a too low $CO_2$ concentration. The step of verifying, whether the user is allowed to adjust a property of the water mineralized based on the water recipe may comprise the step of determining, whether ions added by the mineralization device can damage at least one component of the beverage dispenser, if the set temperature is higher than a predetermined temperature. The ions solved in the beverage can react with parts of the beverage dispensers, such as a seal, a conduit, a beverage preparation element or the like, if the temperature is higher than a predetermined temperature. Thereby, damage of the water dispenser or elements thereof may occur.

The terms "predetermined temperature range" and "predetermined $CO_2$ concentration range" do not have to be interpreted that the method has to individually calculate a predetermined temperature range and/or a predetermined $CO_2$ concentration range.

In one embodiment the method may display the default temperature range as the predetermined temperature range and/or the default $CO_2$ concentration range as the predetermined $CO_2$ concentration range. The default temperature range may be the maximum temperature range and/or the default $CO_2$ concentration range may be the maximum $CO_2$ concentration range. In this embodiment the method may reset the set carbonization rate to a predetermined value (such as no added $CO_2$), if the use rises the set temperature to a value at which no $CO_2$ can be added. Further, the method may reset the set temperature to a predetermined value (such as a low temperature), if the use rises the set carbonization rate to a value at which no $CO_2$ can be added at the user selected set temperature.

The invention also discloses a beverage dispenser comprising an inlet coupled to a water source, a filter for filtering the water drawn from the water source, a mineralization device for mineralizing the filtered water, a tempering device for tempering the filtered water, a carbonization device for carbonating the filtered water, and an outlet for outputting the water into a user vessel and a display. The inlet, the filter, the mineralization device and the outlet may be arranged in serial flow relationship. The tempering device and the carbonization device may be arranged between the filter and the mineralization device. The filter may be a demineralization device, such as a reverse osmosis filter.

The beverage dispenser may comprise according to the present invention a controller adapted to control at least one of the mineralization device, the tempering device, the carbonization device, and the display according to the above described method. Thereby, damage of the beverage dispenser and elements thereof may be avoided, and the user is provided with beverage having a reproducible mineralization and thus taste.

The carbonization device may be a flow-type carbonization device and/or the tempering device may be a flow-type tempering device and/or the mineralization device may be a flow-type mineralization device. Since the carbonization device, the tempering device and the mineralization device are flow-type devices, no stagnation of water or beverage may occur between these devices. This allows the beverage dispenser to prepare a user selected water or beverage having a selected mineralization, a selected temperature and/or a selected carbonization.

The flow rate through the mineralization device, the tempering device, the carbonization device and the outlet is equal during preparing the beverage. Thus, no stagnation occurs downstream of the filter. This has the advantage that the user can individually select the beverage and individually adapt parameters of the beverage, such as water.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The invention is now described in further detail with reference to non-limiting and exemplary embodiments of the present invention, wherein

FIG. 8 shows a second exemplary water recipe.

DETAILED DESCRIPTION OF THE INVENTION

Figure 1:
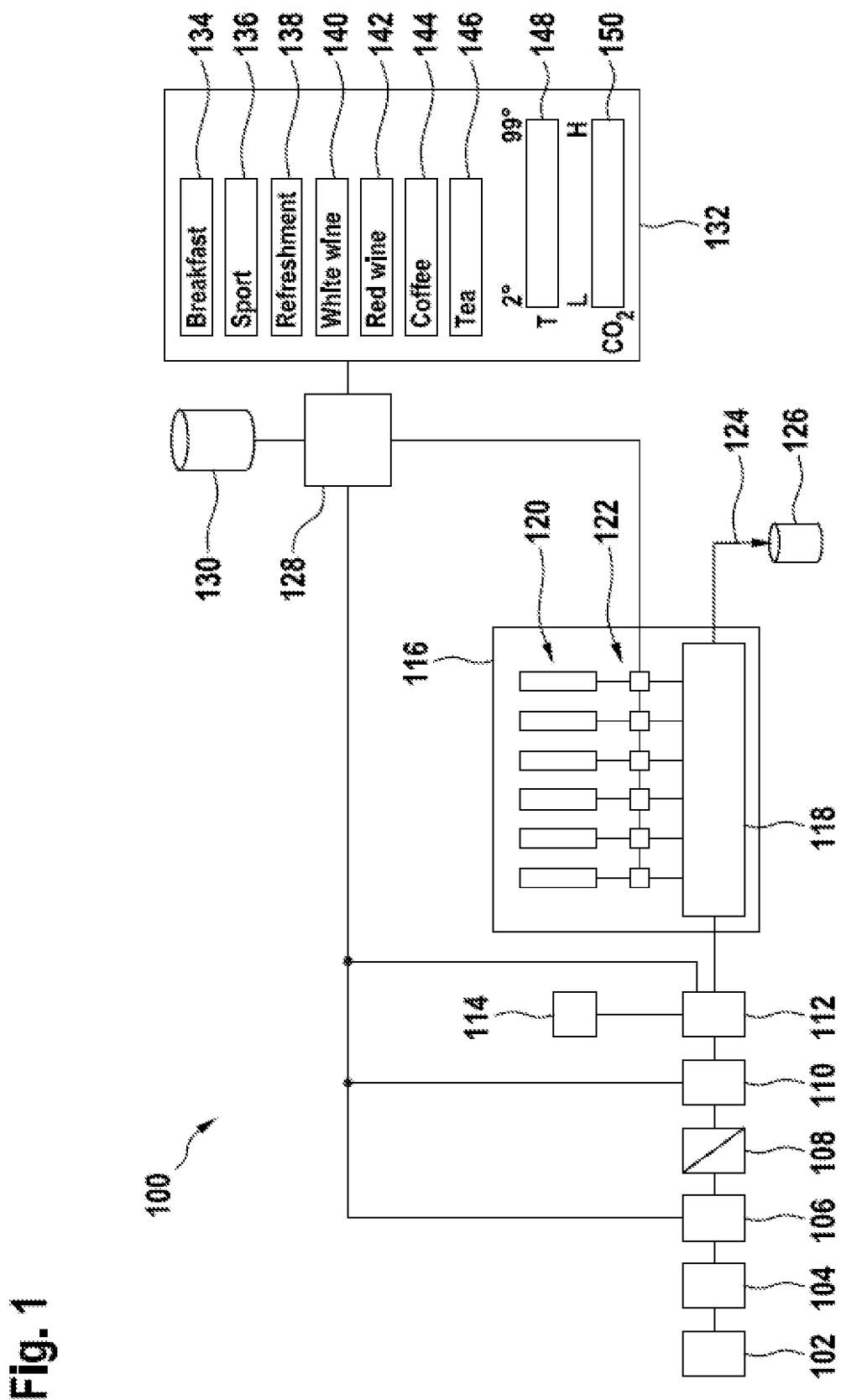
FIG. 1 shows a schematic overview of the beverage dispenser according to the present invention.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The beverage dispenser 100 and the underlying method according to the present invention and the operation thereof according to the present invention is now described in further detail with reference to FIG. 1. The water dispenser 100 is connected to a water source 102 which may be tap water or a tank. A prefilter, such as an active carbon filter 104 is connected to the water source. A pump 106 is connected between the prefilter 104 and a reverse osmosis filter 108. The pump 106 pumps water under high-pressure such as 8 bar to 20 bar into the reverse osmosis filter 108, wherein the concentrate is discarded or drained and the permeate is passed to beverage preparation elements 110, 112 and 116 described in further detail below.

The beverage preparation elements 110, 112, 116 comprise a beverage tempering device 110 for tempering the beverage to the desired temperature (set temperature). The tempering device 110 may be a flow-type tempering device. The beverage entering the tempering device 110 at the inlet comprises the same flow rate as beverage output by the tempering device 110 at the outlet.

The beverage preparation element 112 comprises a carbonization device adapted to carbonize the beverage by adding $CO_2$ stored in a carbonizing bottle 114 filled with $CO_2$. The carbonization device 112 is adapted to carbonize the beverage to the desired carbonization and set carbonization, respectively. In other words, the carbonization device 112 solves $CO_2$ in the beverage in the concentration desired by a user. A carbonization device is disclosed in the European patent application EP 18182943.3, wherein the disclosure thereof is incorporated in its entirety into the present application. The carbonization device 112 is a flow-type carbonization device. In other words, the carbonization device 112 does not comprise any tank and beverage streaming into the inlet of the carbonization device 112 has the same flow rate as beverage streaming out of the outlet of the carbonization device 112.

The water flows from the flow-type carbonization device 112 to the mineralization device 116. The permeate output by the reverse osmosis filter 108 is demineralized water and is remineralized by the mineralization device 116. The beverage passes through a mixing portion 118, in which ions and/or minerals and/or trace elements are added to the beverage. Such mixing portion is disclosed in the European patent applications EP 17203425.8 and EP 18207971.5, wherein the disclosure thereof is incorporated into this application in its entirety into the present application.

The ions and/or minerals and/or trace elements are stored in a plurality of mineralization bottles 120, wherein each mineralization bottle 120 comprises a predetermined type of minerals and/or trace elements or comprises a plurality of predetermined types of minerals and/or trace elements. The minerals and/or trace elements are solved in a fluid, preferably water. The mineralization bottles and an extraction device is disclosed in the European patent application EP 17202640.3, which is incorporated by reference in its entirety into the present application.

Each mineralization bottle 120 is connected to a micro-metering pump 122 that delivers a predetermined amount of minerals and/or trace elements stored in the mineralization bottle 120 into the mixing portion 118 and thus the beverage.

Such micro-metering pump 122 is disclosed in the European patent application EP 18210743.3, which is incorporated by reference in its entirety into the present patent application.

The beverage dispenser 100 further comprises a controller 128 connected to the pump 106, the tempering device 110, the carbonization device 112 and the micro-metering pumps 122. Thus, the controller 128 can control the pressure in the beverage preparation devices 110, 112 and 116 by controlling the pump. Further, the controller 128 can control the temperature of the beverage output by the beverage dispenser 100 by controlling the tempering device 110. Further, the controller 128 may control the $CO_2$ concentration in the beverage (carbonization) by controlling the carbonization device 112. Further, the controller 128 may control the mineral concentration (mineralization) of the beverage by controlling the mineralization device 116, particularly by controlling the micro-metering pumps 122.

According to the present invention the controller 128 controls the beverage preparation elements 110, 112 and 116 such that each beverage generated by the beverage preparation elements comprises an individual mineralization and individual temperature and an individual $CO_2$ concentration.

The present invention allows beverage to be individualized for each user. The inventive method and inventive beverage dispenser may output successively different beverages comprising different set mineral concentrations, different set temperatures and different set $CO_2$ concentrations, particularly the inventive method and inventive beverage dispenser may output successively individual beverages comprising individual set mineral concentrations, individual set temperatures and individual set $CO_2$ concentrations.

Figures 6, 7:
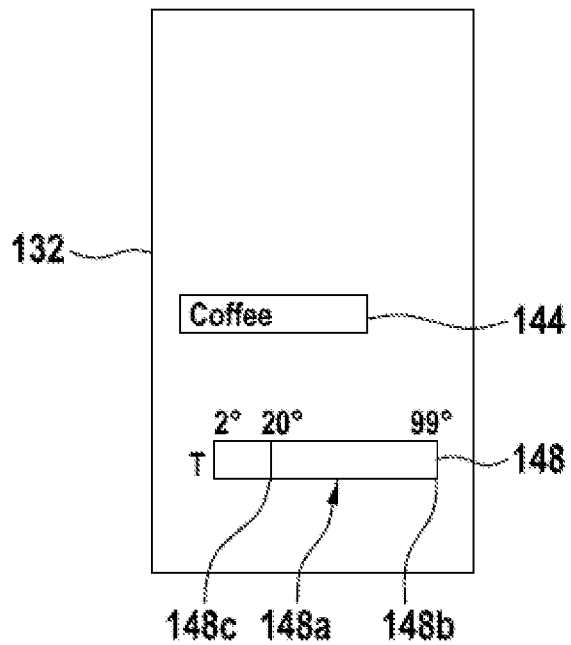
FIG. 6 shows water suitable for preparing coffee.
FIG. 7 shows a first exemplary water recipe.

The controller is connected to a database 130 that comprises a plurality of water recipes and beverage recipes, respectively. Each water recipe and beverage recipe, respectively comprises data about the amount and type of minerals (ions, trace elements) to be added to the water by the mineralization device 116. Further, each beverage recipe and water recipe, respectively may comprise optional data about the predetermined temperature range of the desired temperature (set temperature) and data about the predetermined carbonization range of the desired carbonization (set carbonization). FIG. 7 shows an exemplary water recipe for the purpose of remineralizing after sports and FIG. 8 shows an exemplary water recipe for the purpose of refreshment.

The controller 128 is further connected to a display 132. The controller 128 displays on the display 132 a plurality of buttons 134, 136, 138, 140, 142, 144, 146 for selecting a suitable water recipe. The plurality of water recipes may comprise in an exemplary embodiment a water recipe for breakfast water that can be chosen by button 134, a water recipe for remineralizing after sports that can be chosen by button 136 and a water recipe for refreshment purposes that can be chosen by button 138. The exemplary plurality of water recipes also includes a water recipe for white wine accompaniment that can be selected by 140 and a water recipe for red wine accompaniment that can be chosen by button 142. The exemplary plurality of water recipes also includes a water recipe for preparing coffee that can be selected by button 144 and a water recipe for preparing tea that can be selected by button 146.

Thereby, the user may select an individual recipe for generating water.

To each water recipe an individual amount and/or concentration of minerals to be metered into the water by the mineralization device 116 is assigned. Thus, the controller 128 controls the micro-metering pumps 122 based on the concentrations and/or amounts of minerals assigned to the respective water recipe.

The controller 128 can display on the display 130 a temperature user interface element 148 for adapting the set temperature for the beverage to be output by the beverage dispenser. The controller can display on the display 132 a carbonization user interface element 150 for adapting the carbonization ($CO_2$ concentration) of the beverage output by the beverage dispenser 100.

Figure 2:
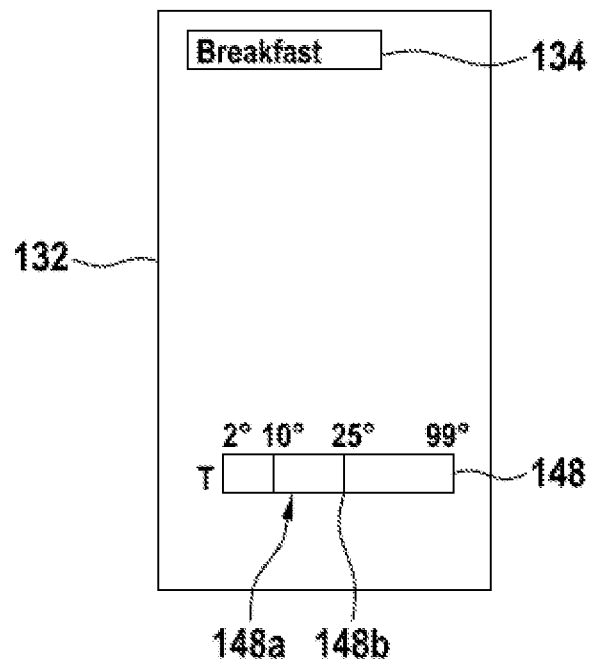
FIGS. 2 shows a user interface for selecting breakfast water.

Reference is made to FIG. 2 showing the display 132 after the user has selected the button 134 for preparing water suitable for breakfast. The controller displays on the display 132 the temperature user interface 148 wherein, the controller sets a lower temperature threshold of 10° C. and an upper threshold of 25° C. for the predetermined temperature range for selecting the set temperature. The user may select the set temperature with a slider element 148 within the region of 10° C. to 25°. Since water for breakfast shall not comprise carbon dioxide the controller does not activate or display the carbonization user interface element.

Further, the slider 148 can only be positioned to select a set temperature 148b equal or below 25° C. (maximum set temperature 148b). Thereby, the method according to the present invention may avoid that minerals coagulate and/or precipitate in the water dispenser 100 or any water preparation element 110, 112 and 118 or in a conduit transporting the water to the nozzle 124 for outputting the beverage into a user vessel 126.

Figure 3A:
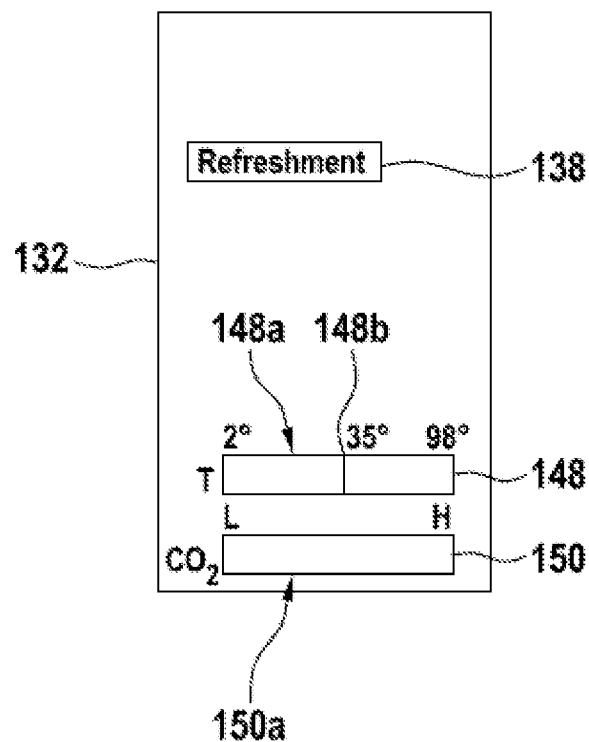
FIGS. 3a, 3b and 3c show a user interface for selecting refreshment water.
Figure 3B:
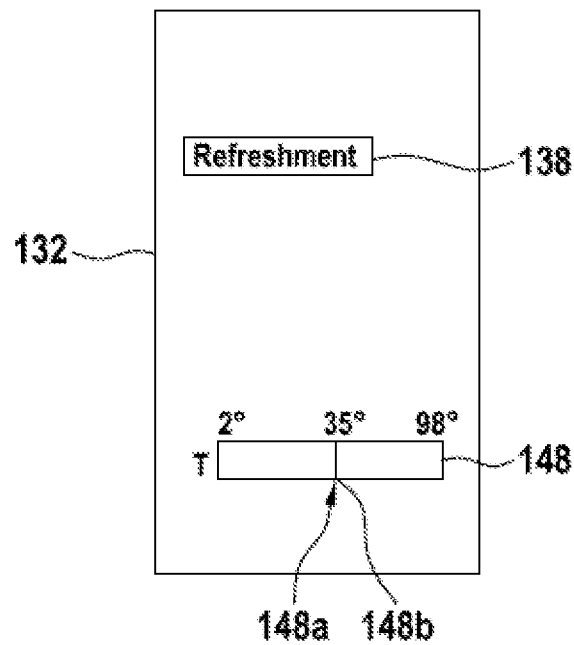
Figure 3C:
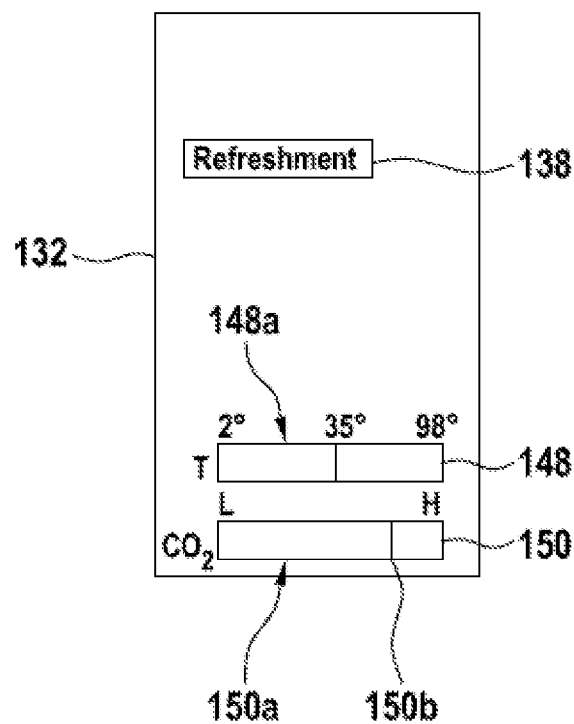
Figure 4:
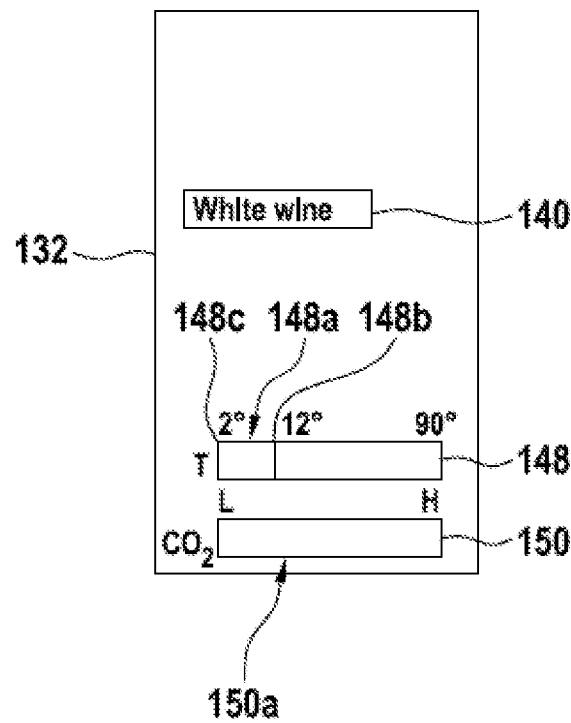
FIG. 4 shows a user interface for selecting water for white wine accompaniment.

Reference is now made to FIGS. 3a to 3c showing an operation after the user has selected the button 138 for generating water for the purpose of refreshment. The controller 128 displays on the display 132 the temperature user interface element 148 having the slider 148a for adjusting the set temperature and the carbonization user interface element 150 having the carbonization slider 150a for selecting the set carbonization.

In the example shown in FIG. 3a the user selected a set temperature of approximately 5° C. for the water to be mineralized by the recipe for the refreshment purpose. The controller sets a maximum set temperature 148b of 35° C. for the water generated by the recipe for the purpose of refreshment. Thereby, coagulation of minerals and precipitation of minerals within the water dispenser 100 may be avoided, since the set temperature cannot reach a temperature, in which precipitation and/or coagulation of the ions and/or minerals solved in the beverage may occur.

In the example according to FIG. 3a the user has selected a set temperature of approximately 5° C. by the slider 148. At this low temperature of 5° C. a high concentration of $CO_2$ can be solved in the water. Therefore, the controller activates and/or displays the carbonization user interface element 150 on the display 132 and controls the carbonization user interface element 150 such, that the predetermined $CO_2$ concentration range ranges from no $CO_2$ added to the water (selection L) to the maximum $CO_2$ concentration in the water (selection H). The user may select the appropriate set carbonization by the slider 150a.

Reference is made to FIG. 3b showing an example in which the user selected a set temperature of 35° C. by the slider 114a of the temperature user interface element 148. Since any carbon dioxide added to the beverage will escape at a temperature of 35° C. the controller 128 does not activate and/or display the carbonization user interface element due to the selection of set temperature by the user.

Reference is made to FIG. 3c in which the user also selected the button 138 for preparing water for the purpose of refreshment. The user has selected a set temperature of the water to be generated of approximately 20° C. by the slider 148*a* of the temperature user interface element 148. Since the carbonizer 112 can add CO2 to water having a temperature of 20° C. the carbonization user interface element 150 is activated and displayed on the display 132. Since it is not possible to add a very high concentration of CO2 at a temperature of 20° C. the controller sets the maximum concentration threshold 150*b* to a ratio of 75% of the maximum possible CO2 concentration to be solved in the beverage.

If the user selects the button 140 for mineralizing the water for the purpose of white wine accompaniment the controller 132 displays the temperature user interface element 148 on the display 132 and sets the lower threshold 148*c* of the predetermined temperature range to 2° C. and the upper temperature threshold 148*b* to 12° C. The user can adjust the set temperature by the slider 148*a* between the lower temperature threshold 148*c* the to the higher temperature threshold 148*b* by the slider 148*a*.

Further, the controller 128 displays the carbonization user interface element 150, wherein the user is allowed to adapt the carbonization between the minimum value of 0% added CO2 concentration and 100% of the maximum possible added CO2 concentration by the slider 150*a*.

Figure 5:
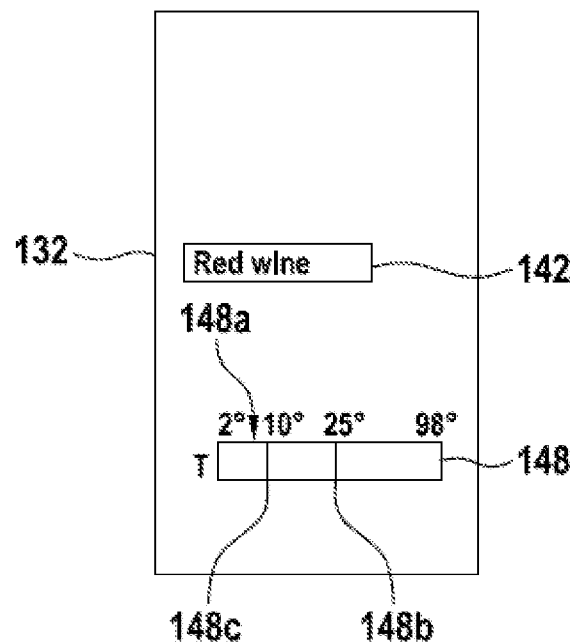
FIG. 5 shows a user interface for selecting water for red wine accompaniment.

Reference is made to FIG. 5 showing an example in which a user selected by the button 142 a recipe for accompaniment of red wine. The controller 128 displays on the display 132 the temperature user interface element 148.

The controller 128 sets the minimum set temperature 148*c* of the predetermined temperature range to 10° C. and the maximum set temperature 148*b* of the predetermined temperature range to 25°. Since it is not reasonable to add CO2 to water drinking purpose of red wine accompaniment and the mineral concentration for red wine accompaniment, the controller 128 does not activate and/or display the carbonization user interface element on the display 132.

In one embodiment the controller 128 may display the default temperature range as the predetermined temperature range on the temperature user interface element 148 on the display 132. The lower threshold temperature 148*c* may minimum temperature of beverage to be provided by the beverage tempering device. The higher threshold temperature 148*b* may maximum temperature of beverage to be provided by the beverage tempering device. The controller may display on the display 132 the default CO2 concentration range as the predetermined CO2 concentration range on the carbonization user interface element 150 on the display 132. The default CO2 concentration range may be the maximum CO2 concentration range that may be provided by the carbonization device 112. In this embodiment the controller 128 may reset the set carbonization rate 150*b* to a predetermined value (such as no added CO2), if the user rises the set temperature 148*b* to a value at which no CO2 can be added. Further, the controller 128 may reset the set temperature 148*b* to a predetermined value (such as a low temperature), if the user rises the set carbonization rate 150*b* to a value at which no CO2 can be added at the user selected set temperature 148*b*.

Reference is made to FIG. 6 showing an example in which the user selected by the button 144 to generate water for preparing coffee. It is known, that the taste of coffee can be improved if the water comprises minerals improving the taste of coffee and does not comprise minerals not improving the taste of coffee. The taste of coffee is influenced inter alia by the water hardness (total hardness, alkalinity), total mineral concentration (conductivity, TDS, pH, sulfate content, Mg content, Ca content).

The controller 128 activates and displays on the user interface 132 the temperature user interface element 148. The controller does not activate the carbonization user interface element, since it is not useful to cook coffee with water comprising a high concentration of CO2 and since the CO2 would escape from the hot water used for cooking coffee. The controller 128 sets the lower threshold temperature 148*c* of the predetermined temperature range to 20° C. and the higher threshold temperature 148*b* of the predetermined temperature range to 99° C. Thus, the user can select by the slider 148*a* a set temperature between 20° C. and 99° C.

The present invention discloses an intelligent beverage dispenser allowing a user to select a beverage and to adapt particular parameters of the beverage. Particularly, the present invention relates to an intelligent water dispenser, wherein the user can select the desired mineralization and mineralization, respectively of the water. The water dispenser may offer a plurality of predefined mineralizations (recipe) for a particular purpose, such as refreshment, remineralization after physical activity, health considerations or the like. The user may adapt the temperature and carbonization of the water before the water is output by the water dispenser into a nozzle.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of controlling operation of a beverage dispenser, comprising the following steps:
   selecting a water recipe from a plurality of water recipes, wherein each water recipe defines a set concentration of minerals to be solved in the water and wherein the water is mineralized based on the water recipe by adding minerals by an mineralization device;

verifying, whether the user is allowed to adjust a user adjustable property of the water to be mineralized by the mineralization device according to water recipe, wherein the user adjustable property comprises at least one of a set temperature of the water to be mineralized and a set carbonization of the water to be mineralized;

preparing the water by at least one water preparation element according to the user adjustable property; and outputting the mineralized water to a user vessel;

further comprising at least one of the following steps:

activating on a display a temperature user interface element for adapting the set temperature of the water to be mineralized in a predetermined temperature range, if the user is allowed to adapt the set temperature within the predetermined temperature range; and activating on the display a carbonization user interface element for adapting the set carbonization of the water to be mineralized in a predetermined $CO_2$ concentration range, if the user is allowed to adapt the set carbonization within the predetermined $CO_2$ concentration range.

2. The method according to claim 1, wherein the water preparation device comprises a tempering device, further comprising the step of tempering the water by the tempering device such that the actual temperature of the water is within a predetermined range about the set temperature before outputting the water to the user vessel.

3. The method according to claim 1, wherein the water preparation device comprises a carbonization device, and the method further comprises the step of carbonating the water by the carbonization device such that the actual carbonization of the water is within a predetermined range about the set carbonization before outputting the water to the user vessel.

4. The method according to any one of claims 1, wherein the mineralization of a water recipe is determined by the purpose of the water recipe and wherein the plurality of water recipes comprises water recipes for at least one of the following purposes:

refreshment of a human;
remineralization of a human;
accompanying a meal;
breakfast;
preparing a meal;
preparing tea;
preparing coffee;
pregnancy;
nursing;
breast feeding;
accompanying white wine;
accompanying red wine;
accompanying spirits;
blending spirits.

5. The method according to any one of claims 1, wherein the step of verifying, whether the user is allowed to adjust a property of the water mineralized based on the water recipe comprises the following steps:

verifying, whether the mineral concentration of the water to be mineralized by the water recipe allows the user to adjust the set temperature;

determining the predetermined temperature range within which the user can adapt the set temperature depending on at least one of the amount and types of minerals to be added by the mineralization device.

6. The method according to claim 5, further comprising the step of activating the temperature user interface element for modifying the set temperature within the predetermined temperature range, if the set mineral concentration of the water to be mineralized by the water recipe allows the user to adjust the set temperature.

7. The method according to claim 1, wherein the step of verifying, whether the user is allowed to adjust a property of the water mineralized based on the water recipe comprises the following steps:

verifying, whether the set mineral concentration of the water to be mineralized by the water recipe allows to adjust the set carbonization;

determining the predetermined $CO_2$ concentration range within which the user can adapt the set carbonization depending on at least one of the amount and types of minerals to be added by the mineralization device.

8. The method according to claim 7, further comprising the step of activating the carbonization user interface element for modifying the set carbonization in the predetermined $CO_2$ concentration range, if the set mineral concentration of the water to be mineralized by the water recipe allows to adjust the set carbonization.

9. The method according to claim 1, wherein the step of verifying, whether the user is allowed to adjust a property of the water to be mineralized based on the water recipe comprises following step:

verifying, whether the set carbonization selected by the user allows to adjust the temperature of the water to be mineralized;

determining the predetermined temperature range within which the user can adapt the set temperature depending on the set carbonization.

10. The method according to claim 9, further comprising at least one of the following steps:

activating a user interface element for modifying the set carbonization, if the set temperature of the water allows to adjust the set carbonization;

activating a user interface element for modifying the set temperature, if the and the set carbonization of the water allows to adjust the set temperature.

11. The method according to claim 1, wherein the step of verifying, whether the user is allowed to adjust a property of the water to be mineralized based on the water recipe comprises the following steps:

verifying, whether the set temperature selected by the user allows to adjust the adjust the carbonization of the water to be mineralized; and determining the predetermined $CO_2$ concentration range within which the user can adapt the set carbonization depending on the set temperature.

12. The method according to claim 1, wherein the step of verifying, whether the user is allowed to adjust a property of the water mineralized based on the water recipe comprises at least one of the following steps:

determining, whether minerals added by the mineralization device can precipitate, if the set temperature is higher than a predetermined temperature;

determining, whether $CO_2$ added by the carbonization device can escape the water, if the set temperature is higher than a predetermined temperature;

determining, whether minerals added by the mineralization device can damage at least one component of the beverage dispenser, if the set temperature is higher than a predetermined temperature;

determining the set temperature range suitable for the set mineral concentration defined by the water recipe and suitable for the drinking purpose;

determining that $CO_2$ may be added based on the set mineral concentration defined by the water recipe and based on the drinking purpose;

determining a set carbonization range suitable for the set mineral concentration defined by the water recipe and suitable for the drinking purpose.

13. A beverage dispenser comprising
an inlet coupled to a water source;
a filter for filtering the water drawn from the water source;
an mineralization device for mineralizing the filtered water;
a tempering device for tempering the filtered water;
a carbonization device for carbonating the filtered water;
an outlet outputting the water into a user vessel;
a display; and;
a controller adapted to control at least one of the mineralization device, the tempering device, the carbonization device and the display operated according to the method of claim 1.

14. The beverage dispenser according to claim 13, characterized by at least one of the following:
the carbonization device is a flow-type carbonization device;
the tempering device is a flow-type tempering device;
the mineralization device is a flow-type mineralization device.

15. The beverage dispenser according to claim 14, wherein the flow rate through the mineralization device, the tempering device, the carbonization device and outlet is equal during preparing the beverage.

* * * * *